US012755169B2

(12) United States Patent
P K et al.

(10) Patent No.: US 12,755,169 B2
(45) Date of Patent: Oct. 6, 2026

(54) WORKFLOW-SPECIFIC RECOMMENDATION FRAMEWORK

(71) Applicant: SAP SE, Walldorf (DE)

(72) Inventors: Sumaiya P K, Bangalore (IN); Prateek Bajaj, New Delhi (IN)

(73) Assignee: SAP SE, Walldorf (DE)

(*) Notice: Subject to any disclaimer, the term of this patent is extended or adjusted under 35 U.S.C. 154(b) by 1131 days.

(21) Appl. No.: 17/453,558

(22) Filed: Nov. 4, 2021

(65) Prior Publication Data

US 2023/0135064 A1 May 4, 2023

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS 10,614,345 B1 * 4/2020 Tecuci ..................... G06N 3/08
10,827,023 B1 * 11/2020 Yan ....................... H04L 67/535
11,163,875 B1 * 11/2021 Roundy .................. G06F 21/56
2019/0026634 A1 * 1/2019 Homeyer ............... G06N 20/00
2019/0367019 A1 * 12/2019 Yan ......................... G06N 3/09
2020/0125586 A1 * 4/2020 Rezaeian ................ G06F 3/048
2020/0252405 A1 * 8/2020 Sankavaram ........... G06F 21/62
2021/0201128 A1 * 7/2021 Xu ......................... G06N 20/20
2021/0311751 A1 * 10/2021 Sheoran .................. G06N 3/08
2023/0368043 A1 * 11/2023 Macklin ................. G06N 5/022

FOREIGN PATENT DOCUMENTS

JP 6801491 B2 * 12/2020

OTHER PUBLICATIONS

Adilova, L., Natious, L., Chen, S., Thonnard, O., & Kamp, M. (Jun. 2019). System misuse detection via informed behavior clustering and modeling. In 2019 49th Annual IEEE/IFIP International Conference on Dependable Systems and Networks Workshops (DSN-W) (pp. 15-23). IEEE. (Year: 2019).*

* cited by examiner

*Primary Examiner* — Ryan Barrett
(74) *Attorney, Agent, or Firm* — Buckley, Maschoff & Talwalkar LLC

(57) ABSTRACT

Systems and methods include acquisition of data representing one or more user interactions with a user interface of an application, determination of a user workflow from a plurality of user workflows based on the acquired data, determination of one of a plurality of trained models based on the determined user workflow, each of the plurality of trained models associated with a respective one of the plurality of user workflows, and generation of an inference based on the data using the determined trained model.

9 Claims, 5 Drawing Sheets

WORKFLOW-SPECIFIC RECOMMENDATION FRAMEWORK

BACKGROUND

Traditional computing system architectures include one or more servers executing applications which access data stored in one or more database systems. Users interact with an application to view, create and update the data in accordance with functionality provided by the application. Functions may include estimation, forecasting, and recommendation of data values based on stored data. Such functions are increasingly provided by trained neural networks, or models.

A model may be trained to infer a value of a target (e.g., a delivery date) based on a set of inputs (e.g., fields of a sales order). The training may be based on historical data (e.g., a large number of sales orders and their respective delivery dates) and results in a trained model which represents patterns in the historical data. The trained model may be use to infer a target value for which it was trained (e.g., a delivery date) based on new input data (e.g., fields of a new sales order).

In some scenarios, the accuracy and/or precision of such a trained model may be unsuitable. Model performance may be improved by changing the structure (i.e., the hyperparameters) of the model, re-training the model based on larger volumes of training data, changing the training algorithm, or using any other known techniques. However, due to the many different usage scenarios of a given application, it is difficult to efficiently provide a trained model which is sufficiently suitable for use in a large majority of scenarios.

DETAILED DESCRIPTION

The following description is provided to enable any person in the art to make and use the described embodiments and sets forth the best mode contemplated for carrying out some embodiments. Various modifications, however, will be readily-apparent to those in the art.

Briefly, some embodiments provide multiple trained models for use by an application. One of the trained models is selected based on a workflow in which the user is determined to be engaged and used to generate an inference. The workflow may be determined based on data indicating the user's activity within the application. The target of each trained model may be identical (e.g., a product recommendation) or different.

A workflow may consist of a set of activities. Activities are user interactions with a user interface of an application, including but not limited to selecting a displayed icon (e.g., via a mouse-click), hovering a cursor over a graphic for a particular length of time, selecting a drop-down menu, and inputting text into a field. According to some embodiments, a network may be trained to identify a workflow based on an input set of data representing user activity. The identified workflow may then be used to select a workflow-specific trained model for generating a desired inference. Embodiments may thereby facilitate identification of a suitable trained model during runtime and based on user-generated data.

Figure 1:
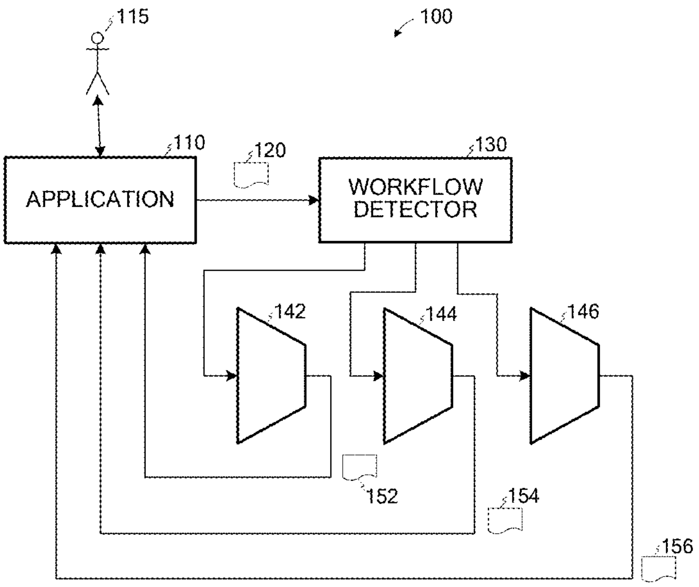
FIG. 1 is a block diagram of an architecture to select and utilize one of multiple trained models based on user workflow according to some embodiments.

FIG. 1 is a block diagram of an architecture of system 100 according to some embodiments. The illustrated elements of system 100 may be implemented using any suitable combination of computing hardware and/or software that is or becomes known. Such a combination may include implementations which apportion computing resources elastically according to demand, need, price, and/or any other metric. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service).

Application 110 may comprise any suitable software application providing functionality one or more users such as user 115. Application 110 may provide such functions in conjunction with a database system (not shown), which may be standalone, distributed, in-memory, column-based and/or row-based as is known in the art.

Application 110 may be a component of a suite of applications provided by an application provider. Application 110 may be executed by an application platform comprising an on-premise, cloud-based, or hybrid hardware system providing an execution platform and services to software applications. Such an application platform may comprise one or more virtual machines executing program code of an application server. All software applications described herein may comprise program code executable by one or more processing units (e.g., Central Processing Units (CPUs), processor cores, processor threads) of an application platform to provide various functions.

As is known in the art, user 115 interacts with user interfaces provided by application 110. In some embodiments, such user interfaces comprise a client user interface (UI) component of software code which is downloaded to a Web browser operated by user 115 and is executed thereby. The client UI component communicates with a server UI component based on the user interactions. Accordingly, via the client UI component, application 110 may acquire data representing all user activities with respect to the user interfaces. Application 110 may transmit this data to workflow detector 130 in order to receive a model inference.

Workflow detector 130 determines a workflow based on data 120. A workflow may comprise a logical characterization of user activities represented by data 120. In one example, application 110 is an online shopping application which allows browsing, searching, and purchasing of products. User 115 accesses application 110 and inputs search terms into a search bar corresponding to a particular product. Application 110 returns a large set of search results, and user 115 clicks on the first result, reviews the corresponding product page, returns to the search results and clicks on the second result, and reviews the corresponding product page. Data 120 represents each of these user activities, and workflow detector 130 may determine that the data 120 represents a "browsing" workflow.

The determination of workflow detector 130 may be performed via known clustering algorithms. For example, data 120 may be compared to data of pre-defined clusters, where each pre-defined cluster corresponds to a particular workflow. Workflow detector 130, as will be described below, may itself consist of a trained model which outputs workflows/trained model selections as described below.

Models 142, 144 and 146 comprised trained models which may be selected by workflow detector 130 according to some embodiments. Embodiments are not limited to three trained models. Each of models 142, 144 and 146 may comprise a network of neurons which receive input, change internal state according to that input, and produce output depending on the input and internal state. The output of certain neurons is connected to the input of other neurons to form a directed and weighted graph. The weights as well as the functions that compute the internal state can be modified via training as will be described below. Each of models 142, 144 and 146 may comprise any one or more types of artificial neural network that are or become known, including but not limited to convolutional neural networks, recurrent neural networks, long short-term memory networks, deep reservoir computing and deep echo state networks, deep belief networks, and deep stacking networks.

According to some embodiments, each of models 142, 144 and 146 is associated with a particular workflow. For example, model 142 may be associated with the "browsing" workflow, model 144 may be associated with an "active purchaser" workflow, and model 146 may be associated with an "unlikely purchaser" workflow. Workflow detector 130 may operate to identify a model which is associated with the detected workflow, and to instruct transmission of data 120 to the identified model. According to some embodiments, workflow detector 130 detects a workflow based on data 120 and identifies a model based thereon but transmits data other than or in addition to data 120 to the identified model. That is, the data used to detect a workflow need not be the same data which is then input to a corresponding identified model.

Each of models 142, 144 and 146 may comprise the same or different hyperparameters. Each of models 142, 144 and 146 may receive input data and generate a respective inference 152, 154 and 156 based thereon. The respective inferences 152, 154 and 156 may represent the same or different inference targets. For example, each of models 142, 144 and 146 may be trained to output a product recommendation, or at least one of models 142, 144 and 146 may be trained to output an inference target other than a product recommendation.

Figure 2:
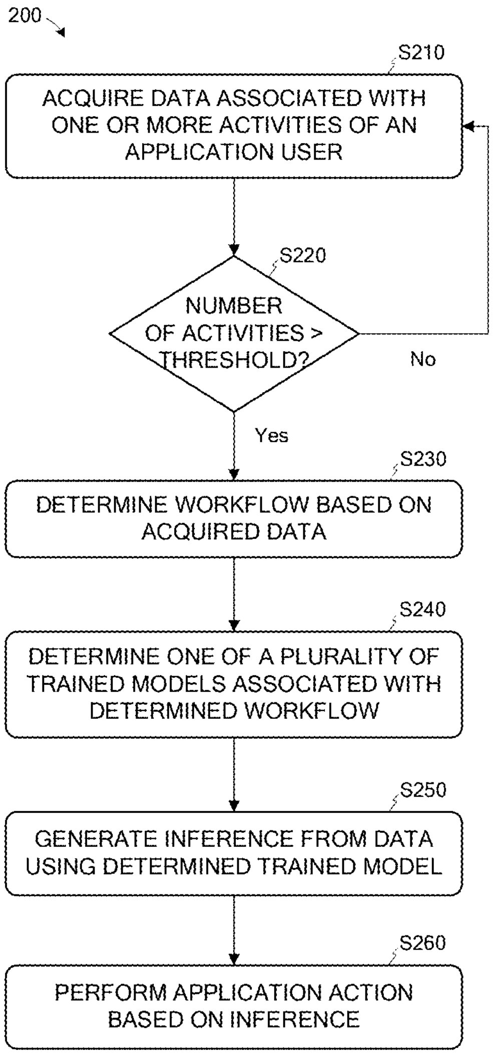
FIG. 2 is a flow diagram of a process to select and utilize one of multiple trained models based on user workflow according to some embodiments.

FIG. 2 comprises a flow diagram of process 200 to select and utilize one of multiple trained models based on user workflow according to some embodiments. Portions of process 200 will be described below as if executed by workflow detector 130, but embodiments are not limited thereto.

Process 200 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

Initially, at S210, data associated with one or more activities of an application user is acquired. S210 may be triggered in response to a received request from an application to generate an inference. In some embodiments, the data may be acquired in the background during execution of an application as part of a continuous monitoring/logging process. The acquired data may conform to any format that is or becomes known and may represent user interactions with user interfaces of the application. According to some embodiments, the data may also represent user interactions with user interfaces of one or more other applications.

At S220, it is determined whether the number of activities represented in the acquired data is greater than a threshold number. If not, flow returns to S210 to acquired data associated with an additional one or more activities of the application user. The threshold number is intended to represent a minimum number of activities needed to provide a sufficiently accurate determination of an associated workflow. For example, it would be difficult to determine a workflow in which a user is engaged based on a single mouse click. Accordingly, S220 ensures that such a determination occurs only after sufficient data has been acquired.

Flow proceeds from S220 to S230 once the number of activities in the acquired data has exceeded the threshold. At S230, a workflow is determined based on the acquired data. According to some embodiments, workflows are initially defined (i.e., prior to process 200) by applying a clustering algorithm to sets of historical data representing user activities. Each cluster resulting from the algorithm represents a different workflow. In such a case, the clustering algorithm may be applied to the acquired data at S230 in order to identify the cluster (and therefore the workflow) to which it belongs.

In some embodiments, the workflow is determined by inputting the acquired data to a model trained to infer a workflow based on such data. The training of a workflow determination model is described below with respect to FIG. 4.

Next, at S240, one of a plurality of trained models is determined based on the workflow determined at S230. As will be described in detail below with respect to FIG. 3, each of the plurality of trained models may be trained to output a target based on data which corresponds to a particular workflow. Accordingly, the trained model determined at S240 may be the model which was trained based on data corresponding to the workflow determined at S230.

An inference is generated at S250 using the determined trained model. In some examples, the data acquired at S210 is input to the determined trained model and the inference is output by the trained model. According to other examples, the data input to the determined trained model may comprise data in addition to or other than data representing user activity. For example, user activity data may be user to determine the workflow in which the user is engaged, but the user's prior purchase history may be input to the determined trained model to determine a product recommendation. In this regard, each of the plurality of trained models may be trained to output a product recommendation based on a user's prior purchase history.

An action is performed by the application at S260 based on the inference. Continuing the above example, the action may comprise presentation of a product recommendation to the user, but embodiments are not limited thereto. In some embodiments, S230 is executed periodically to provide an updated determination of a workflow in which a user is currently engaged, and the remaining steps of process 200 are executed only after receiving a request from the application to generate an inference.

Figure 3:
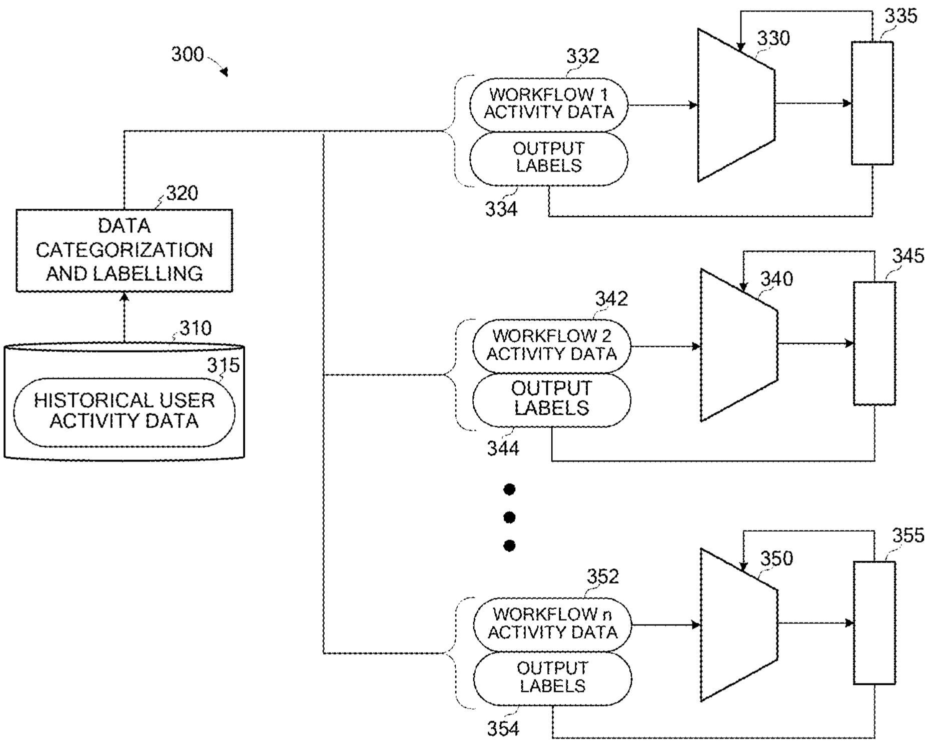
FIG. 3 is a block diagram of an architecture to train multiple models based on historical user activity data according to some embodiments.

FIG. 3 illustrates training architecture 300 according to some embodiments. The training depicted in FIG. 3 occurs before process 200 in order to generate the trained models used therein.

Training architecture 300 includes storage device 310 storing historical user activity data 315. Historical user activity data 315 may be acquired from any number of sources, and may comprise logs generated during past execution of an application with which the models trained by architecture 300 are intended to be utilized. Storage device 310 may comprise any suitable storage and may be remote from the other depicted components of architecture 300.

Historical user activity data 315 is categorized and labelled by data categorization and labelling component 320. In one example, an administrator, application developer or another entity operates categorization and labelling component 320 to assign each of a plurality of sets of activity data 315 to a workflow. This assignment requires initial definition of workflows which are associated with the application and which are believed to require different trained models, in view of the desired inference target. In the case of an online shopping application and an inference target=product recommendation, the administrator, application developer or other entity may define workflows of "browsing", "active purchaser" and "unlikely purchaser". Embodiments are not limited to any particular type and/or number of identified workflows.

A set of activity data 315 may represent a single user session with the application associated with activity data 315. Accordingly, data categorization and labelling component 320 is operated to assign, manually or using any suitable automation steps, various sets of activity data 315 to one of the defined workflows. Moreover, a desired inference output (i.e., a "label") is associated with each set of activity data assigned to a workflow. As is known in the art, the label associated with a set of activity data is intended to assist training of a model such that the model learns a mapping of the set of activity data to the label.

More specifically, the sets of activity data associated with each respective workflow and the associated labels are used to train a respective model. Model 330 is associated with a first workflow (i.e., "Workflow 1). Workflow 1 activity data 332 includes the sets of activity data 315 which were assigned to Workflow 1 by data categorization and labelling component 320, while each of output labels 334 corresponds to one set of Workflow 1 activity data 332, as also assigned by categorization and labelling component 320.

Similarly, model 340 is associated with a second workflow (i.e., "Workflow 2). Workflow 2 activity data 342 includes the sets of activity data 315 which were assigned to Workflow 2 by data categorization and labelling component 320, and each of output labels 344 corresponds to one set of Workflow 2 activity data 342. As illustrated, embodiments may utilize any N models associated with N workflows.

Models 330 through 350 may differ and may conform to any type of model structure that is or becomes known. As mentioned above, the target of each of models 330, 340 and 350 may differ. For example, each of labels 334 used to train model 330 may comprise a product recommendation while each of labels 344 used to train model 340 may comprise a projected profit.

During training of model 330 (340, 350), one or more sets of workflow-specific activity data 332 (342, 352) are input to model 330 (340, 350) and an output corresponding to each set is generated by the model. Loss layer 335 (345, 355) determines a loss by comparing, for each set of activity data, the output generated by the model to the output label 334 (344, 354) associated with the set of activity data. The total loss is back-propagated to model 330 (340, 350) in order to modify parameters of model 330 (340, 350) in an attempt to minimize the total loss. Model 330 (340, 350) is iteratively modified in this manner until the total loss reaches acceptable levels or training otherwise terminates (e.g., due to time constraints or to the loss asymptotically approaching a lower bound). At this point, model 330 (340, 350) is considered trained.

According to some embodiments, the performance of a trained model is evaluated based on testing data. Testing data may consist of sets of workflow-specific activity data (and associated labels) which were not used in the training of a respective model. Testing may include determination of a total loss as described above with respect to the testing data.

Figure 4:
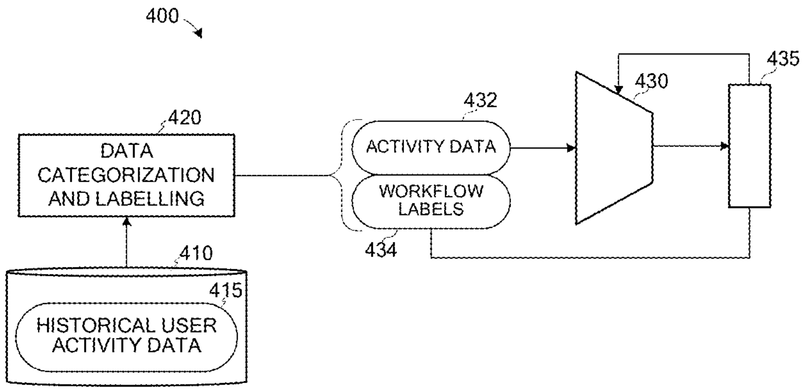
FIG. 4 is a block diagram of an architecture to train a workflow detector model based on historical user activity data according to some embodiments.

FIG. 4 illustrates architecture 400 to train model 430 to determine a workflow based on an input set of activity data according to some embodiments. Each of storage device 410, historical user activity data 415 and data categorization and labelling component 420 may be implemented and operate as described above with respect to storage device 310, historical user activity data 315 and data categorization and labelling component 320 of FIG. 3. As such, it may be assumed that each set of user activity data within historical user activity data 415 has been assigned to a specific workflow.

In the FIG. 4 architecture, an identifier of a workflow assigned to a set of activity data is used as a label to train model 430. Specifically, activity data 432 includes sets of user activity data. Workflow labels 434 include a workflow identifier corresponding to each set of activity data of data 432. Accordingly, model 430 may be trained using activity data 432, workflow labels 434 and loss layer 435 as described above to receive a set of activity data and to output a workflow identifier. Thusly-trained model 430 may therefore implement workflow detector 130 of FIG. 1.

Figure 5:
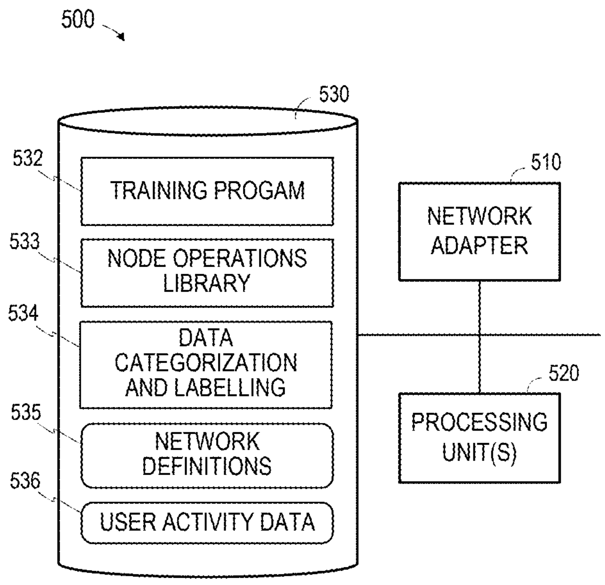
FIG. 5 is a block diagram of an apparatus to train models according to some embodiments.

FIG. 5 illustrates computing system 500 according to some embodiments. System 500 may comprise a computing system to facilitate the training of multiple workflow-specific models according to some embodiments. System 500 may comprise a standalone system, or one or more elements of computing system 500 may be implemented by cloud-based machine learning services.

System 500 includes network adapter 510 to communicate with external devices via a network connection. Processing unit(s) 520 may comprise one or more processors, processor cores, or other processing units to execute processor-executable program code. In this regard, storage system 530, which may comprise one or more memory devices (e.g., a hard disk drive, a solid-state drive), stores processor-executable program code of training program 532 which may be executed by processing unit(s) 520 to train a model based on labeled training data as described herein.

Training program 532 may utilize node operations library 533, which includes program code to execute various operations associated with node operations as defined in node operations library 533. According to some embodiments, computing system 500 provides interfaces and development software (not shown) to enable development of training program 532 and generation of network definitions 535 which define the hyperparameters of one or more workflow-specific models. Storage device 530 also includes program code of data categorization and labelling component 534 which may operate to define sets of activity data based on user activity data 536 and associate workflow identifiers therewith as described above.

Figure 6:
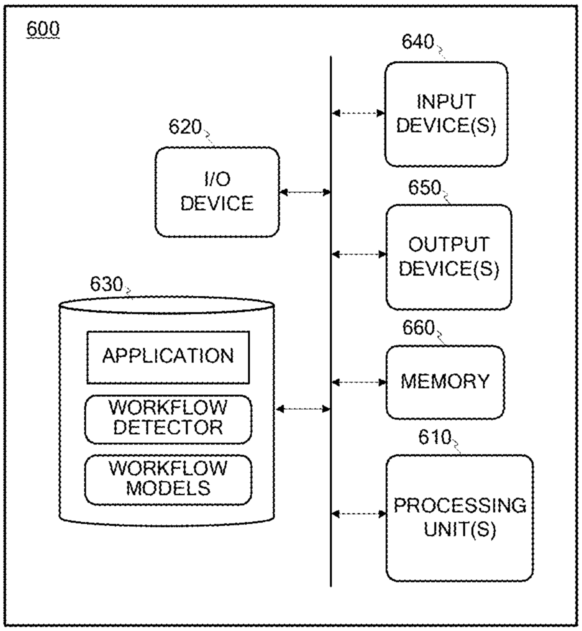
FIG. 6 is a block diagram of a hardware system to provide an application and selection and utilization of one of multiple trained models based on user workflow according to some embodiments.

FIG. 6 is a block diagram of a hardware system hardware system to match sourcing event items with agreements according to some embodiments. Hardware system 600 may comprise a general-purpose computing apparatus and may execute program code to perform any of the functions described herein. Hardware system 600 may be implemented by a distributed cloud-based server and may comprise an implementation of application 110 in some embodiments. Hardware system 600 may include other unshown elements according to some embodiments.

Hardware system 600 includes processing unit(s) 610 operatively coupled to I/O device 620, data storage device 630, one or more input devices 640, one or more output devices 650 and memory 660. Communication device 620 may facilitate communication with external devices, such as an external network, the cloud, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into hardware system 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, and RAM devices, while memory 660 may comprise a RAM device.

Data storage device 630 stores program code executed by processing unit(s) 610 to cause server 600 to implement any of the components and execute any one or more of the processes described herein. Embodiments are not limited to execution of these processes by a single computing device. Data storage device 630 may also store data and other program code for providing additional functionality and/or which are necessary for operation of hardware system 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

at least one processing unit; and a non-transitory machine-readable medium storing instructions that, when executed by the at least one processing unit, cause the at least one processing unit to perform operations comprising:

acquiring data identifying one or more user interactions executed by an application user on a user interface of an application;

inputting a first subset of the acquired data to a first trained model to predict, from a plurality of user workflows, a first user workflow in which the application user is engaged;

identifying one of a plurality of trained models which has been trained based on historical data identifying one or more user interactions executed by prior application users engaged in the first user workflow, each of the plurality of trained models having been trained based on respective different historical data identifying one or more user interactions executed by prior application users engaged in a respective different one of the plurality of user workflows, and each of the plurality of trained models having been trained to output a different respective inference target; and generating an inference by inputting a second subset of the acquired data to the identified trained model, the second subset and the first subset being mutually exclusive.

2. A system according to claim 1, wherein acquiring the data comprises determining whether a number of user interactions represented by the data exceeds a threshold.

3. A system according to claim 1, the instructions, when executed by the at least one programmable processor, cause the at least one programmable processor to perform operations comprising:

acquiring data identifying a second one or more user interactions executed by the application user on the user interface of the application;

inputting a first subset of the second acquired data to the first trained model to predict, from the plurality of user workflows, a second user workflow in which the application user is engaged;

identifying a second one of the plurality of trained models which has been trained based on historical data identifying one or more user interactions executed by prior application users engaged in the second user workflow; and generating a second inference by inputting a second subset of the second acquired data to the second identified trained model the second subset of the second acquired data and the first subset of the second acquired data being mutually exclusive.

4. A method comprising:

acquiring data identifying one or more user interactions executed by an application user on a user interface of an application;

inputting a first subset of the acquired data to a first trained model to predict, from a plurality of user workflows, a first user workflow in which the application user is engaged;

identifying one of a plurality of trained models which has been trained based on historical data identifying one or more activities executed by prior application users engaged in the first user workflow, each of the plurality of trained models having been trained based on respective different historical data identifying one or more activities executed by prior application users engaged in a respective different one of the plurality of user workflows, and each of the plurality of trained models trained to output a different respective inference target; and generating an inference by inputting a second subset of the acquired data to the identified trained model, the second subset and the first subset being mutually exclusive.

5. A method according to claim 4, wherein acquiring the data comprises determining whether a number of user interactions represented by the data exceeds a threshold.

6. A method according to claim 4, further comprising:

acquiring data identifying a second one or more user interactions executed by the application user on the user interface of the application;

inputting a first subset of the second acquired data to the first trained model to predict, from the plurality of user workflows, a second user workflow in which the application user is engaged;

identifying a second one of the plurality of trained models which has been trained based on historical data identifying one or more user interactions executed by prior application users engaged in the second user workflow; and generating a second inference by inputting a second subset of the second acquired data to the identified second trained model, the second subset of the second acquired data and the first subset of the second acquired data being mutually exclusive.

7. One or more non-transitory computer-readable media storing processor-executable program code executable by a processing unit of a computing system to cause the computing system to:

acquire data identifying one or more user interactions executed by an application user on a user interface of an application;

inputting a first subset of the acquired data to a first trained model to predict, from a plurality of user workflows, a first user workflow in which the application user is engaged;

identify one of a plurality of trained models which has been trained based on historical data identifying one or more user interactions executed by prior application users engaged in the first user workflow, each of the plurality of trained models having been trained based on respective different historical data identifying one or more user interactions executed by prior application users engaged in a respective different one of the plurality of user workflows, and each of the plurality of trained models having been trained to output a different respective inference target; and generate an inference by inputting a second subset of the acquired data to the identified trained model, the second subset and the first subset being mutually exclusive.

8. The one or more non-transitory computer-readable media according to claim 7, wherein acquisition of the data comprises determination of whether a number of user interactions represented by the data exceeds a threshold.

9. The one or more non-transitory computer-readable media according to claim 7, the program code executable by a processing unit of a computing system to cause the computing system to:

acquire data identifying a second one or more user interactions executed by the application user on the user interface of the application;

input a first subset of the second acquired data to the first trained model to predict, from the plurality of user workflows, a second user workflow in which the application user is engaged;

identify a second one of the plurality of trained models which has been trained based on historical data identifying one or more user interactions executed by prior application users engaged in the second user workflow; and generate a second inference by inputting a second subset of the second acquired data to the second identified trained model the second subset of the second acquired data and the first subset of the second acquired data being mutually exclusive.

* * * * *